United States Patent
Romero

[11] Patent Number: 5,823,251
[45] Date of Patent: Oct. 20, 1998

[54] HEAT EXCHANGER

[75] Inventor: Francis Romero, Angers Cedex, France

[73] Assignee: Piscine Service Anjou SA, France

[21] Appl. No.: 782,421

[22] Filed: Jan. 14, 1997

[30] Foreign Application Priority Data

Jan. 26, 1996 [FR] France ................................. 96 01196
Jul. 9, 1996 [FR] France ................................. 96 08790

[51] Int. Cl.⁶ ............................................... F28F 9/12
[52] U.S. Cl. ...................... 165/158; 165/175; 165/178; 165/906
[58] Field of Search ................................. 165/158, 173, 165/175, 178, 906

[56] References Cited

U.S. PATENT DOCUMENTS

| | | | |
|---|---|---|---|
| 2,223,320 | 11/1940 | Iacocks | 165/158 |
| 2,240,537 | 5/1941 | Young | 165/175 X |
| 3,721,291 | 3/1973 | Massaro, Jr. et al. | 165/158 |
| 3,768,550 | 10/1973 | Williamson et al. | 165/158 X |
| 4,047,563 | 9/1977 | Kurata | 165/158 |

FOREIGN PATENT DOCUMENTS

| | | |
|---|---|---|
| 1 089 816 | 3/1955 | France . |
| 1 449 311 | 8/1966 | France . |
| 2 636 416 | 3/1990 | France . |
| 907899 | 8/1953 | Germany ............................. 165/158 |
| 28 48 304 | 5/1980 | Germany . |
| 3408412 | 12/1984 | Germany . |
| 335307 | 12/1954 | Switzerland . |
| 1 366 437 | 9/1974 | United Kingdom . |
| 2180 | 6/1984 | WIPO . |

*Primary Examiner*—Leonard R. Leo
*Attorney, Agent, or Firm*—Laff, Whitesel, Conte & Saret, Ltd.

[57] ABSTRACT

A heat exchanger of the tube bundle type has a cylindrical body unit with an intake and outlet for the primary fluid. End sections of the body have closing flanges across which the tubes pass. Each flange is made of a material of rubber type and has a circular plate which bears on it periphery a set of circular lips. The flange rests with one of the sets of lips on a radial surface of the corresponding end section of the body unit. A mount element with a radial front surface rests on the other set of lips. A screw fastened to the outer wall of each end section locks the mouth element against the flange between the mount element and the body.

13 Claims, 9 Drawing Sheets

COUPE I-I

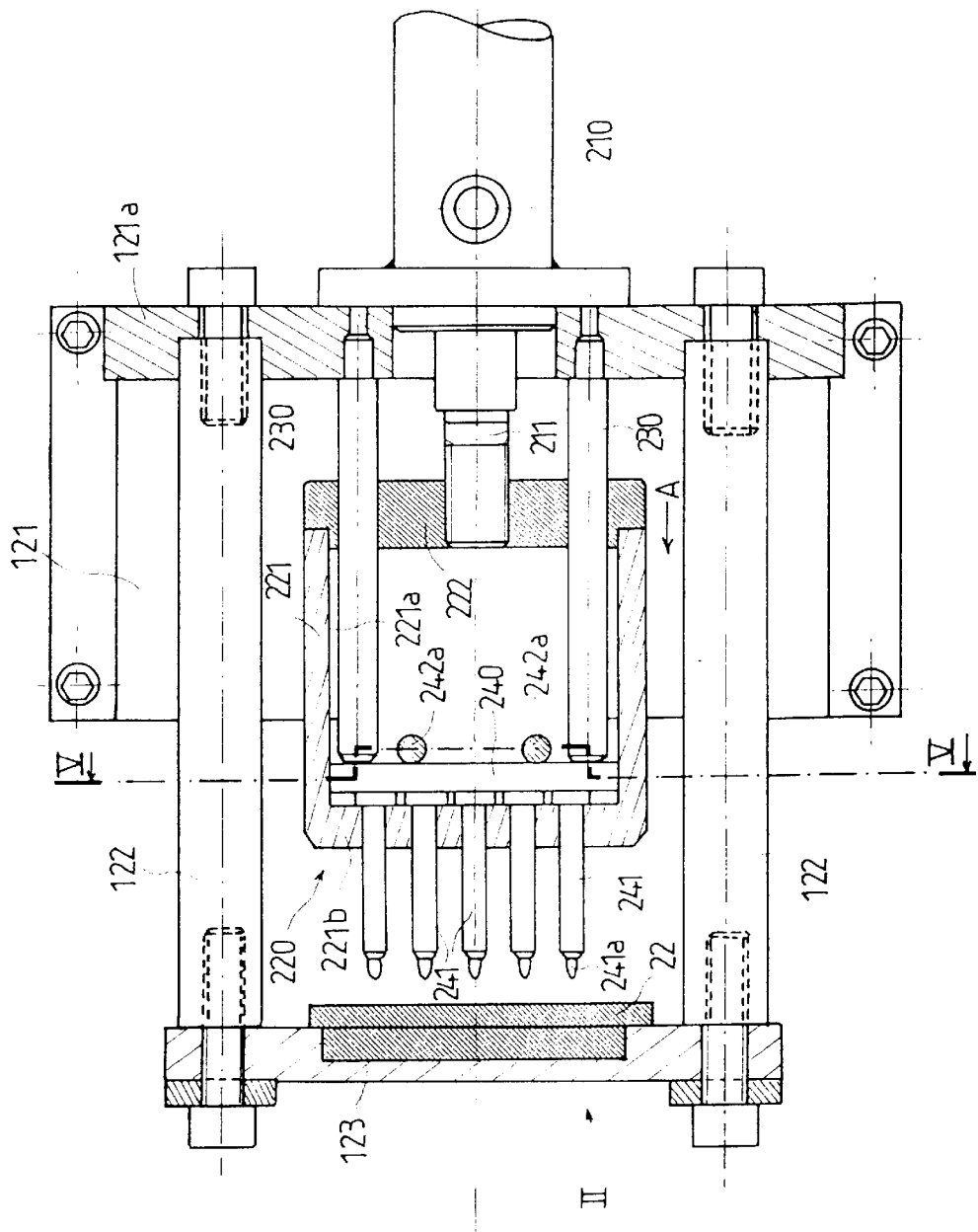
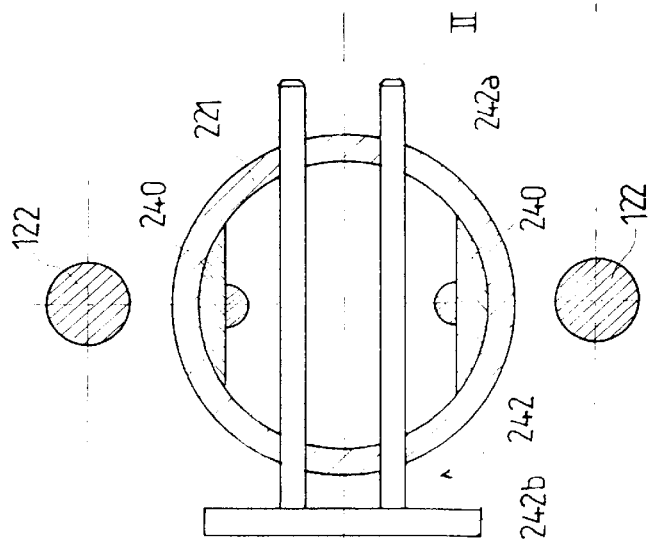
FIG.5a
FIG.5b

HEAT EXCHANGER

The invention relates to a heat exchanges. A heat exchanger of this type is, for example, a water/water exchanger intended for use in the heating circuit of a swimming pool.

More particularly, the invention relates to a heat exchanger of the rectilinear and parallel tube bundle type, consisting of a body unit of generally cylindrical shape which is provided with an intake and an outlet for the primary fluid, and the end sections of which are provided with flanges enclosing the said body unit, and across which the said tubes pass, mouth outlets for the intake and outlet of the secondary fluid, these being provided at the respective ends of the said body unit.

More precisely, the object of the invention is to provide a heat exchanger which is simple and economical to instal.

In order to attain this object, the heat exchanger according to the invention is of the type described above, in which each flange, which is formed from a material of the rubber type, consists of a circular plate, each of the faces of which bears in its periphery a set of circular lips, parallel to one another, the said flange being intended to rest, for one of the said sets of lips, on a radial surface of the corresponding end section of the said body element, each mouth aperture comprising an end section designed with a front radial surface, intended to rest on the other set of lips of the said flange, and a screw being provided in order to allow screwing to the outer wall of each end section of the said body unit, the said screw being provided with means to lock the said mouth aperture against the said flange in such a way that the said flange is locked between the said mouth and the said body unit.

According to another characteristic of the heat exchanger according to the invention, each mouth aperture contains on its end section a lug intended to penetrate into a groove provided in the end section of the said body unit in such a way as to immobilise the said mouth aperture against rotation while the screw is being screwed onto the body unit. To advantage, it may comprise reinforcing plates which are mounted respectively between a flange and a mouth aperture, the said reinforcing plates possibly comprising at least one bracer element.

According to another characteristic of the heat exchanger according to the invention, each flange is pierced by holes for the passage of the said tubes of the tube bundle, the said holes being provided with at least on lip.

The present invention likewise relates to a machine intended to allow for the installation of the tubes from the tube bundle onto the flanges of the heat exchanger described above. The particular problem posed by this operation is that it is not possible to instal the tubes one by one in each hole in the flanges, and that it is therefor necessary to fit the bundle in one single block, which presupposes relatively intense threading pressures. In addition to this, there is the strong probability that each tube, when being threaded into the hole in the corresponding flange, may damage the wall of the hole, which is prejudicial to the sealing effect between the tube and the wall.

The object of the invention is therefore to provide a machine which will allow for the problems described to be resolved.

It is noted that, without this machine, the installation of the heat exchanger according to the invention does not seem possible, and that this machine is destined to be used in this application.

Such a machine is therefore of the type which comprises means of installation such as will allow for the tubes of the tube bundle to be installed in the holes of each flange of the said heat exchanger. According to one characteristic of the invention, the said means of installation comprise a support element to support one of the said flanges of the heat exchanger, a multiplicity of finger elements, equal in number to the number of tubes in the bundle which is to be installed, means to allow the said finger elements to penetrate and transverse the corresponding holes in the flange mounted on the said support in such a way that the said flange is able to rest on the said finger elements, means to allow for each tube of the bundle to be guided as an extension of a finger element, coaxially to the said finger element, and means which will allow for a flange resting on the said finger elements to be pushed in such a way as to allow it to pass onto the tubes of the said flange which function as extensions to the said finger elements, the diameter of the said finger elements being slightly greater than the diameter of the said tubes which are to be fitted.

According to another characteristic of the invention, the said finger elements are designed so as to be displaced axially in an initial direction, such as to be able to penetrate the corresponding holes in the flange mounted on the said support, and in a second direction in order to involve with them a flange resting on them, the said finger elements being designed in such a way as to be able to cross the end wall of a cylinder, the said cylinder being designed so as to be displaced axially relative to the said finger elements in the initial direction, in order for the said end wall to be able to push the said flange, resting on the finger elements, in order for it to move onto the tubes.

According to another characteristic of the invention, the said finger elements are supported by a disk designed in order to allow for axial sliding movement in a blind hole in the said cylinder.

According to another characteristic of the invention, the said cylinder is designed in order to be activated by actuating media, and in that a fork element is provided in order for the said cylinder to be connected to the said disk bearing the said finger elements.

According to another characteristic of the invention, the said machine comprises rods which are designed to accommodate the said tubes of the tube bundle which are to be fitted, and to allow them to be fitted in position as an axial extension of the said finger elements.

The characteristics of the invention referred to above, as well as others, will become clearer when reading the following description based on an embodiment, the said description being provided in conjunction with the appended drawings, of which:

FIG. 5a is a sectional view of an installation head of a machine according to the invention;

FIG. 5b is a sectional view according to the section V/V of FIG. 5a;

Figure 1:
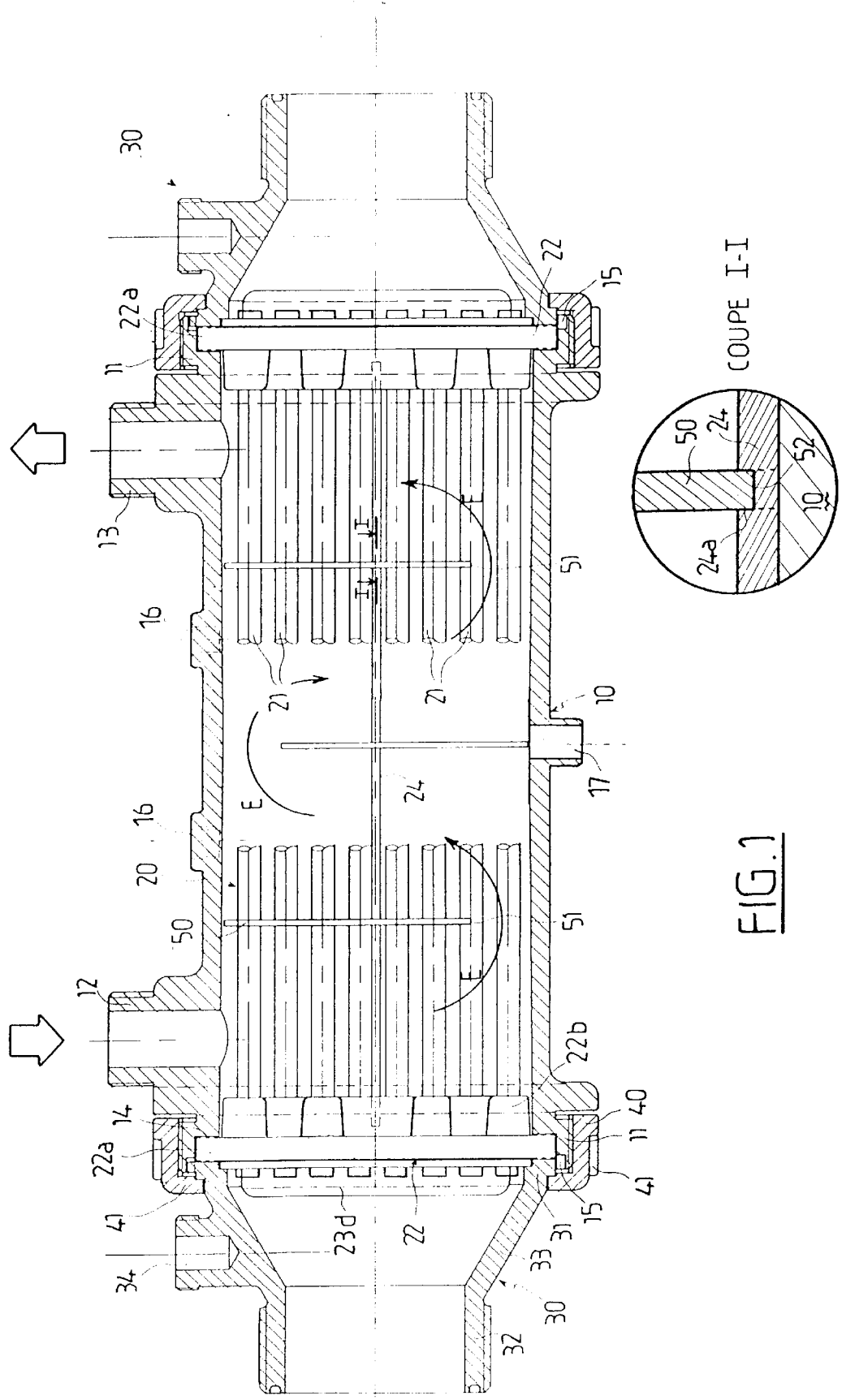
FIG. 1 is a sectional view of the heat exchanger according to the invention.

The heat exchanger, which is shown as fitted in FIG. 1, consists essentially of a body element 10, generally cylindrical in shape, the end sections 11 of which are likewise cylindrical, and are provided with a screw thread over a length of some centimeters. The body element 10 is, to advantage, made of a mouldable plastic material, for example by injection moulding. To advantage, this material is a polyamide, reinforced by particles of glass.

The cylindrical body element 10 is provided with a fluid intake 12 and a fluid outlet 13 respectively, consisting of sleeves created directly in the moulding, the ends of which are provided with screw threads, and are thus designed to accommodate suitable ducting elements for the transport of the primary fluid. This fluid accordingly passes through the intake 12 into the interior space created by the body element 10, in which it transfers its heat to the secondary fluid, as will be seen hereinafter, then emerges from the heat exchanger via the outlet 13.

Installed in the interior of the body element 10 is the heat exchanger system 20, which consists essentially of a bundle of rectilinear tubes 21, mounted parallel to each other by their ends, in holes bored in the flanges 22. The tubes 21 are, for example, made of stainless steel or titanium.

Figure 2:
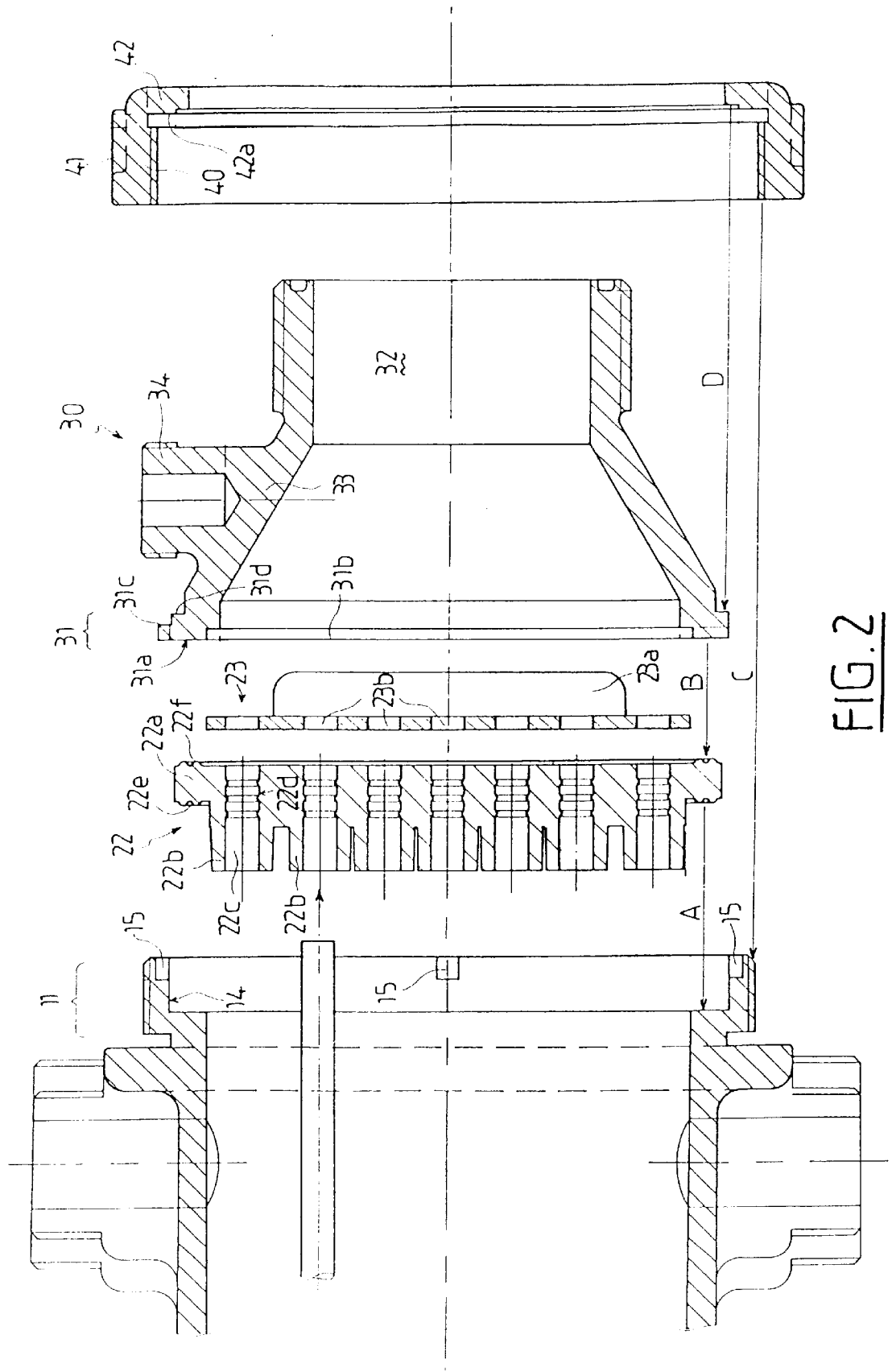
FIG. 2 is a sectional view of one end of a heat exchanger according to the invention, the various different elements of which it is comprised being ready to be installed.

In FIG. 2, which shows one end of the heat exchanger according to the invention, ready to be fitted, it can be seen that each flange 22 consists of a circular plate 22e, on one face of which protrude a number of contact points 22b, slightly truncated, equal in number to the number of tubes in the tube bundles 21. Each contact 22b is pierced by a hole 22c, which passes through the flange 22.

As can be seen from FIG. 1, each tube of the bundle 21 is fitted under the slight application of force into the hole 22c of the corresponding contact 22b, and crosses the flange 22. Each hole 22c is provided with annular lips 22d (FIG. 2), for example of the same number as the holes, of a diameter slightly less than the diameter of the hole 22c. These lips 22d pinch the outer surface of the tube 21, the effect of which is to ensure the sealing effect between the secondary circuit to which the heat exchanger is connected, and the interior of the heat exchanger.

Each flange 22 is formed from a material of the natural or synthetic rubber type. To advantage, use may be made of a thermoplastic elastomer, such as an ethylene and propylene rubber, such as the terpolymer of ethylene-propylene-diene (EPDM). More precisely, use has bee made of the type marketed under the brandname Santoprene (R) by Messrs. Monsanto.

Figure 3:
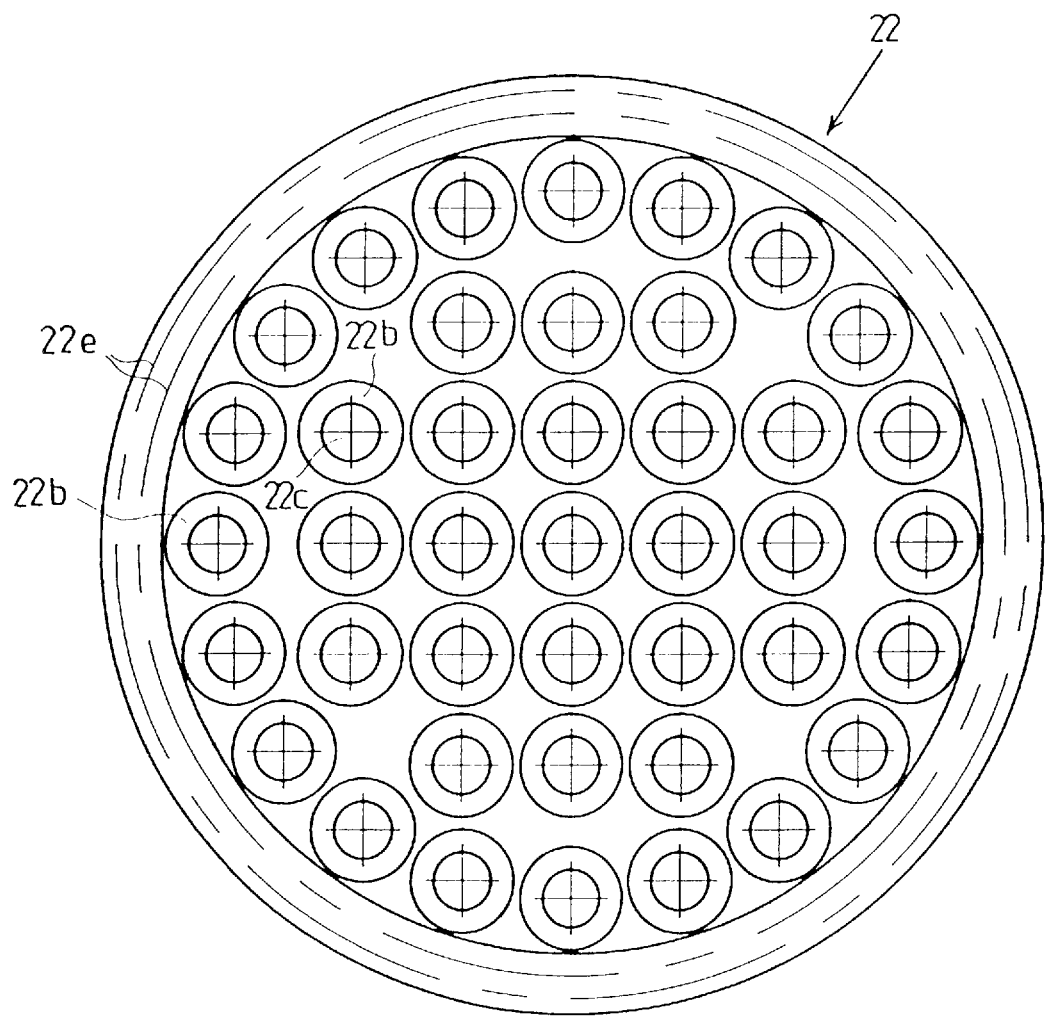
FIG. 3 is a front view of a flange according to the invention.

As can be seen from FIG. 1, during assembly the circular plate 22a is designed to penetrate into the interior of an annular mounting 14 formed on the inside wall of the end section 11 of the body unit 10. This mounting 14 is equally visible in FIG. 2. The peripheral section of the face of the flange 22, which contains the contacts 22b, rests on the base of the mounting 14, as illustrated by the arrow A, the said base accordingly forming a support surface. This peripheral section contains a set of circular lips 22e, parallel to one another, which, by being in contact with the base of the mounting 14, ensure the sealing of the interior of the body unit 10 against the outside. FIG. 3 shows the contacts 22b, the holes 22c, and the lips 22e; the distribution of these elements of the flange 22 can likewise be seen.

A reinforcing plate 23 is provided to rest on the surface of the flange 22, which is located opposite the surface containing the contacts 22b. This is provided to advantage with at least one bracing element 23a. This plate 23 is pierced by holes 23b, which correspond to the holes 22c of the flange 22, so allowing for the passage of tubes.

The function of this plate 23 is to avoid the deformation of the flange 22 under the effect of the pressure of the secondary liquid which circulates inside the body unit 10.

The heat exchanger according to the invention also comprises, at each of its ends, a mouth 30, which features, at an initial end, an end section 31 which is generally cylindrical in shape, and a sleeve 32, the outer surface of which is provided with a screw thread in such a way as to allow it to be connected to suitable duct elements for the secondary fluid. It is noted that, in the embodiment presented, the sleeve 32 is of a diameter less than that of the end section 31, while the said section 31 and the said sleeve 32 are connected to one another by a truncated section 33. This comprises media 34, intended for the possible securing of a measuring tube (not shown), for example for temperature or output.

During assembly, the front radial face 31a of the section 31 of the mouth element 30 rests on a peripheral section 22f of the flange plate 22, as shown by the arrow B. This peripheral section 22f is symmetrical to the section 22e, and, like the latter, is provided with a set of circular lips, parallel to each other, which, by being in contact with the front face 31a of the mouth element 31, ensure the seal between the secondary circuit and the outside.

The section 31 of the mouth element 30 comprises, on its inside face, an annular mounting 31b, which is intended to accommodate the reinforcing plate 23, as can be seen in FIG. 1. A number of screws 40, featuring, for example, media 41 such that a number of flats, to locate a locking key, are provided with a screw thread on their internal diameter in such a way as to be respectively looked onto the external surface of the end sections 11 of the body unit 10, as illustrated by an arrow C. Each screw 40 is provided, on one of its faces, with an annular flange 42, rebated towards its axis. This flange 42 consists of an internal face 42a, which is intended, as can be seen in FIG. 1 and as illustrated by an arrow D in FIG. 2, to rest on a shoulder section 31d of the end section 31.

In order to block the mouth element 30 during its assembly on the body unit 10, and to avoid it rotating while the assembly is being locked with the screw 40, a lug 31c is provided which is intended to penetrate one of the grooves 15, and to be blocked there, on the internal surface of the section 11 of the body unit 10. The body unit 10 contains four grooves 15, while it is possible to select the position of the mouth element 30 from among four different angular positions, depending on the installation of the heat exchanger which is envisaged.

It is noted that, in the embodiment shown, the mouth element 30 is coaxial to the cylindrical body unit 10, while the ducts for the secondary fluid leave the heat exchanger in directions which are mutually co-axial and opposed.

The tubes of the tube bundles 21 pass through holes which are pierced in the disks 50, of truncated circular shape, in such a way that, on an angle obtained of the order, for example, of 120°, their peripheral edges are in contact with the inside wall of the body unit 10, the truncated edge 51 being in turn remote from the said internal wall, which forms a passage for the primary fluid.

The plates 50 are arranged in fives (the edges 51 are turned alternately first in the direction opposite to that of the intake 12, then in the same direction as the intake 12, and so on). Accordingly, the primary fluid, in the body unit 10, follows the trajectory shown by the arrows E in FIG. 1. The plates 50 then form chicanes for the primary fluid, which has the effect of forcing the fluid to lick against all the tubes of the bundle 21, which it would not do without the chicane effect, since it would tend rather to circulate along the tubes of the bundle 21 which are the closest to the intake 12 and the outlet 13. Two cross-members 24 (only the lower one is visible in FIG. 1) are arranged in contact with the inside wall of the body unit 10, diametrically opposite one another, as can be seen in the enlarged inset of FIG. 1, which is a section across I/I of FIG. 1. These comprise rectangular notches 24a, in which the rectangular notches 52 of the plates 50 engage, the said notches 52 being installed perpendicular to the notches 24a; by this means, the plates 50 are securely retained.

A description will now be provided, in relation to FIGS. 4 to 8, on the one hand, of an embodiment of a machine will allow for the fitting of the tubes 21 on the flanges 22 of the heat exchanger described hitherto, and, on the other, of the method of function of such a machine.

Figure 4:
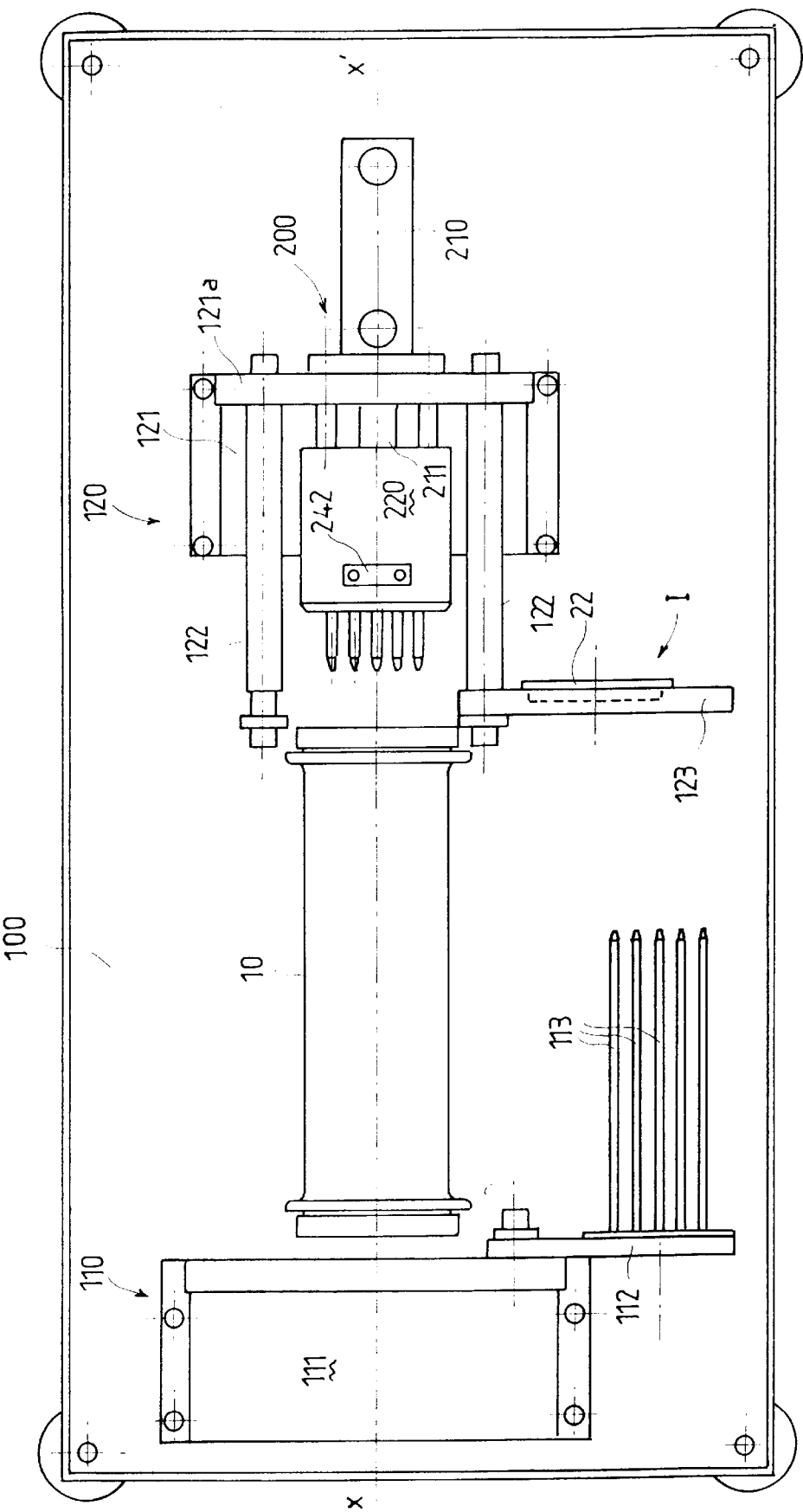
FIG. 4 is a plan view of a machine according to the invention, which allows for the fitting of the flanges of a heat exchanger according to the invention on the tubes.

The machine which is represented in a plan view in FIG. 4 consists essentially of a base element 100 on which are mounted a unit 110 for supporting the rods, and an installation unit 120. This extends longitudinally on an axis xx'. A body element 10 has been represented solely for the purpose of showing its location at the time of assembly. The unit 110 consists essentially of a base unit 111 on which is mounted a support element 112, fitted in such a way as to be capable of causing a support unit 112 to pivot about a horizontal axis, the said support unit being designed to support an assembly of rods 113 parallel to the longitudinal axis xx' of the machine. The number of rods 113 is equal to the number of tubes 21 of the tube bundle of the heat exchanger which is to be installed. In addition to this, the rods 113 are arranged in relation to one another in an identical manner to the tubes of the bundle in the heat exchanger which is to be installed. The support element 112 is designed to pivot in such a way that the rods 113 can adopt an initial position I (which is shown), in which they are displaced in relation to the axis xx' and a second position II in which they are perceptibly on the axis xx'.

As can be seen from the remainder of this description, the rods 113 are intended to accommodate the tubes 21 of the tube bundle which is to be fitted. These rods 113 are, moreover, installed in such a way as to allow the said tubes 21 to be guided into the position of installation.

The installation unit 120 comprises a baseplate 121, provided with a support element 121a, on which are mounted, on the one hand, an installation head 200, and, on the other, cross-members 122. Mounted on one of the cross-members 122, in such a manner as to be able to pivot about a horizontal axis, is a support element or plate 123, intended to support a flange 22 of the heat exchanger which is to be installed. By pivoting, the plate 123 is capable of adopting an initial position I (that of FIG. 4), in which it is offset in relation to the axis xx' of the machine, and a position II (which can be seen in FIG. 5a), in which it is located in front of the installation head 200. In this latter position II, the plate 123 is capable of being rendered unitary with the second cross-member 122. The installation head 200 comprises a device 210 for initiating movement of a block 220, formed in this case of a screw, the shaft of which is fitted on a support 121a, and of which part of the shaft 211 can be seen in FIG. 4. Other devices such a screw may be provided, on condition that they ensure the function of incurring translational movement of the block 220.

The installation head 200 further comprises a block 220, the composition of which is described below in relation with FIGS. 5a and 5b.

In FIG. 5a it can be seen that the block 220 consists essentially of a cylinder 221, featuring a blind cylindrical cavity 221a, closed at one end by a flange 222 and at the other end by an end wall 221b. The flange 222 is rendered unitary with the end of the shaft 211 of the screw 210, for example by screwing. The cylinder 221 can be caused to adopt translatory movement by means of the screw 210.

The flange 222 is pierced with holes provided in order to accommodate the guiding media or guides 230, which take the form of cylindrical rods, secured by one of their ends to the support element 121a. Accordingly, the cylinder 221 is guided, by the guide elements 230, in its translatory movement on the axis xx' of the machine, the origin of this movement being the action of the shank of the screw 210.

Mounted in the cylindrical cavity 221a is a disk 240, in such a way as to be able to slide in that location on the axis xx'. The disk 240 bears, on the face turned towards the blind side of the cavity 221a, a number of finger elements 241, provided at their free ends with pins 241a, which take the form of a reduction in diameter. A pin 241a can be seen in enlargement in FIG. 9. The finger elements 241 are designed in order to slide in the holes pierced in the end wall 221b of the cylinder 221. They are also provided so that, when the disk 240 is in contact with the inside face of the wall 221b, they will surpass the cylinder 221 by a length which is greater than the thickness of a flange 22 of the heat exchanger which is to be installed. It will be noted that the disk 240 is designed in order to be able to locate in contact on the free ends of the guide elements 230.

A number of rods 242a, carried on the same support 242b in such a way as to form a fork element 242, are likewise designed to traverse the cylinder 221 from one end to the other, as can be seen from the sectional view in FIG. 5b. These rods 242a are such that they form an abutment element for the disk 240 when the said disk is in contact against the face 221b of the cylinder 221. The fork element 242 can be withdrawn, so leaving the disk 240 free to slide towards the flange of the wall 222, subject to the position of the cylinder 221 in relation to the guide elements 230. The fork element 242 is likewise visible in FIG. 4, where it can be seen in place.

It will be noted that the fork element 242, when mounted on the cylinder 221, forms, together with the end wall 221b of the cylinder 221, means of coupling the said cylinder 221 to the said disk 240 bearing the finger elements 241.

In order to install a bundle of tubes 21 in the assembly of holes 22c of one of the flanges 22, the procedure should be followed as illustrated hereinafter by way of FIGS. 5a, 5b to 8. First, the said flange 22 is mounted in the seating provided for this purpose in the plate 123, which is then caused to pivot in such a way that it adopts the position II shown in FIG. 5a. The fork element 242 is in place. The screw 210 is then actuated in such a way that the shaft 211 is displaced in the direction A (arrow A). By way of the flange 222, it pushes the cylinder 221, which, by way of the rods 242a of the fork element 242, sets in motion the disk 240 and the finger elements 241. These penetrate the holes 22c of the flange 22, which rest on the plate 123.

The walls of the holes of the flange 22 are not damaged by this procedure due to the fact that the ends of the finger elements 241 do not feature any sharp edges. The screw 210 is again moved in order for it to readopt the initial position (reverse direction of A). Because the flange 22 adheres to the finger elements 241, the flange 22 moves backwards at the same time as the finger elements 241, leaving the plate 123, which, at the end of this operation, can be retracted into its position I.

A tube 21 of the bundle which is to be fitted is threaded onto each rod 113, and the assembly is then placed in position in the axis xx' of the machine, causing the support element 112 to pivot.

Figure 6:
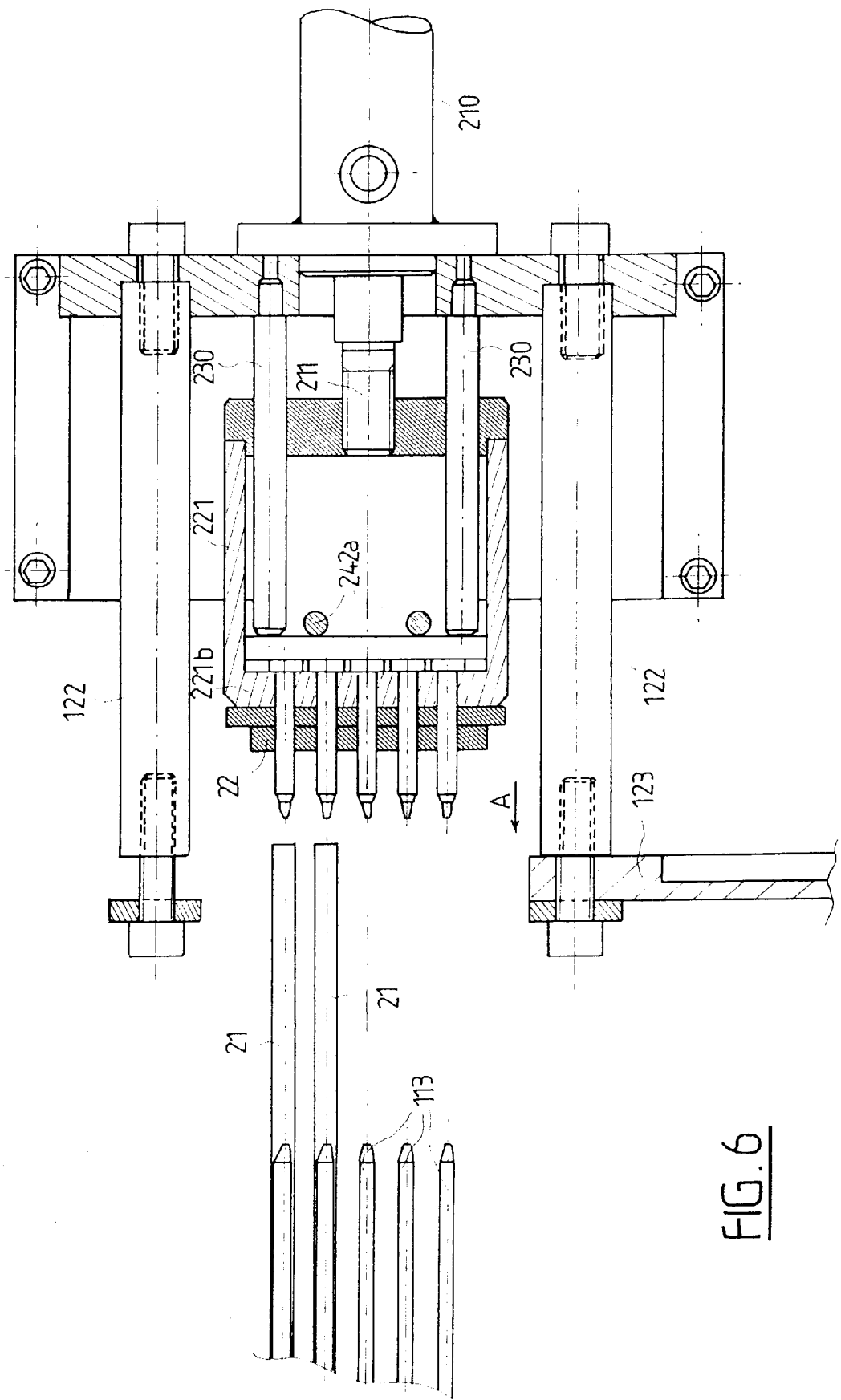
FIG. 6 to 8 illustrate the fitting of a flange on the tubes of a heat exchanger by means of a machine according to the invention.

After these initial procedures, the situation is arrived at as shown in FIG. 6. Only two tubes 21 are shown, mounted on the rods 113, solely for the purpose of comprehension of this FIG. 6.

The following procedure is then adopted. The fork element 242 is retracted, and the screw 210 is again actuated in the direction A, which in turn causes the cylinder 221 to move. The disk 240 is initially actuated since it is in contact with the front wall 221b of the cylinder 221, and since the flange 22 renders it unitary with this wall. It will be moved until the point at which the ends of the finger elements 241 come in contact with the tubes 21. The diameter of the pins 241a is equal, with a slight degree of play, to the internal diameter of the tubes 21, while the finger elements 241 become momentarily unitary with the tubes 21 (see FIG. 9).

Figure 7:
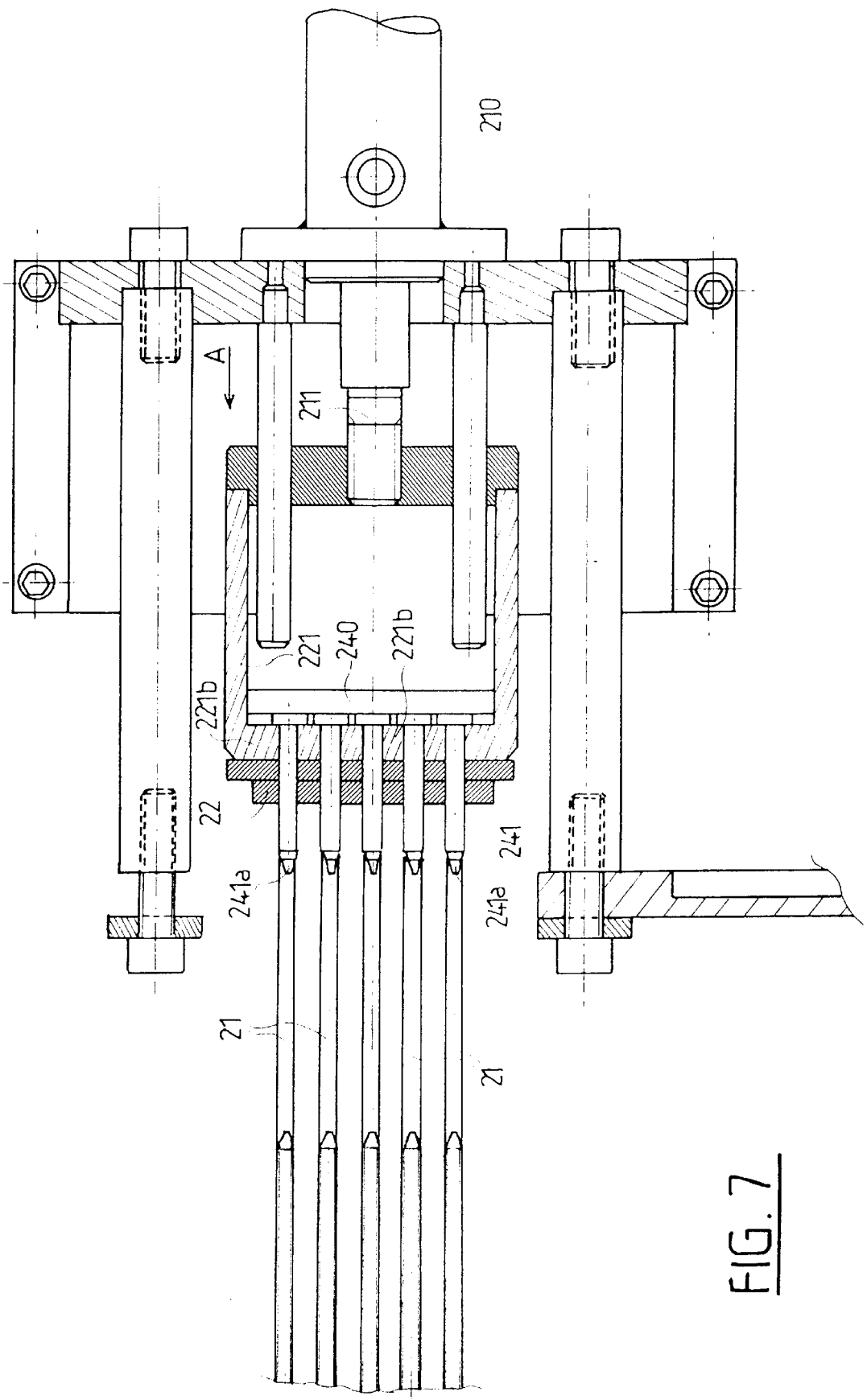
Figure 8:
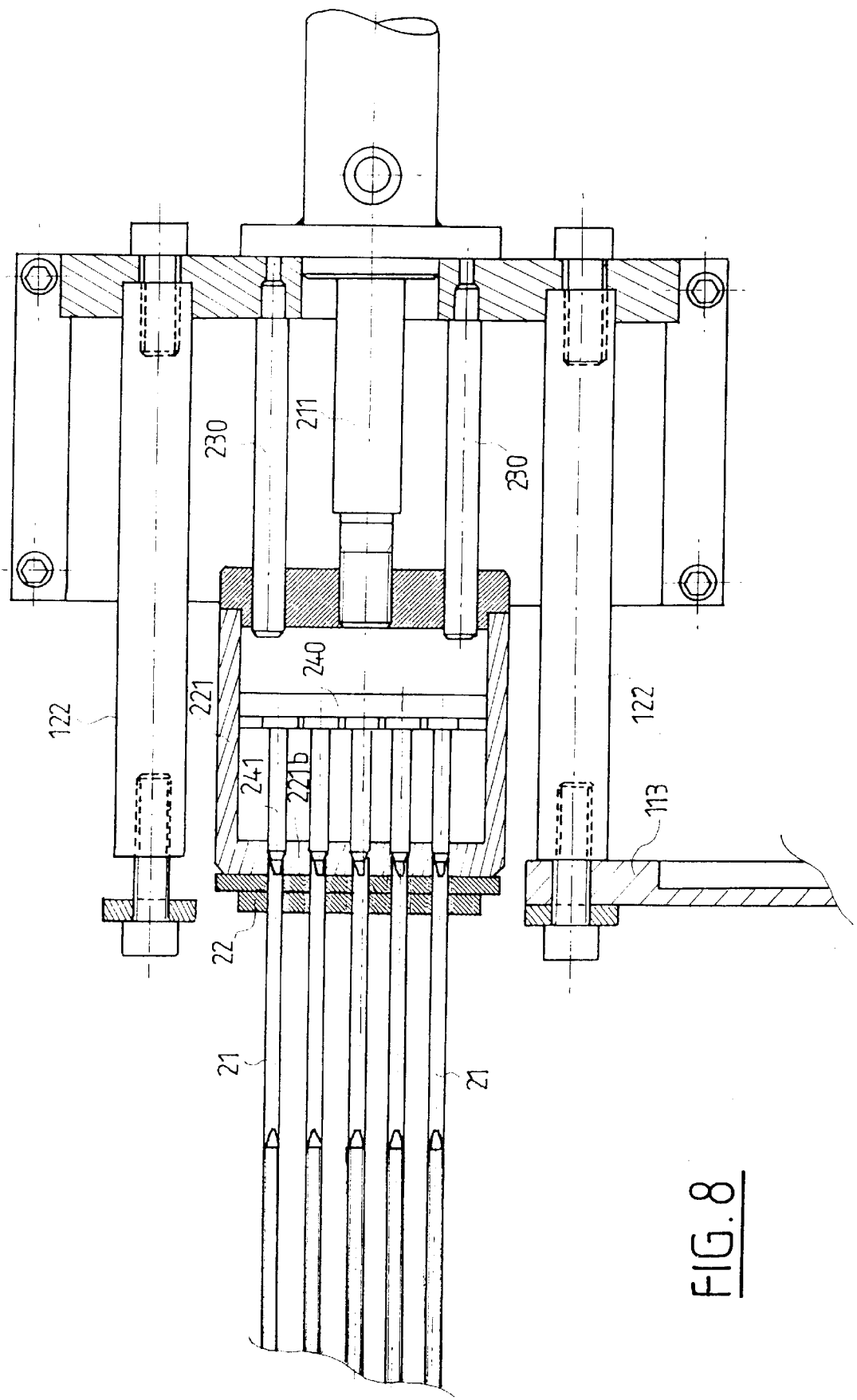

The situation is now that shown in FIG. 7. The shaft 211 of the screw 210 continues its travel in the direction A. The disk 240 cannot move, since the finger elements 241 are in contact with the tubes 21. The cylinder 221 then pushes, by way of its wall 221b, the flange 22, which in turn first slides along the finger elements 241, then onto the ends of the tubes 21. The situation at the end of the travel path of the screw 210 is that shown in FIG. 8.

Figure 9:
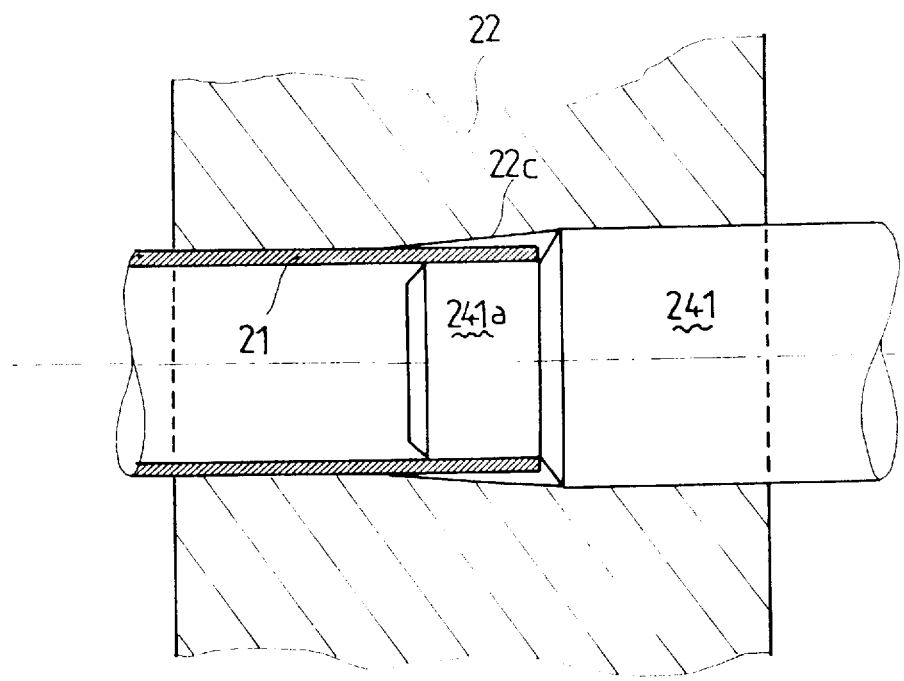
FIG. 9 is a cross-sectional detail figure showing the dimensional relation between a flange, a finger, and a tube.

It will be noted that the path from the flange 22 of the finger elements 241 to the tubes 21 also takes place without damaging the walls of the holes 22c of the flange 22, inasmuch as the diameter of the finger elements 241 is slightly greater than the external diameters of the tubes 21 (as can be seen in FIG. 9).

In FIG. 9 the travel of the flange 2 can be seen from a finger element 241 to a tube 21. It can be seen that the wall of the hole 22c of the flange 22 passes above the sharp edge formed by the periphery of the tube 21, without coming in contact with it, this being due to the difference between the diameters of the finger element 241 and the tube 21.

The screw 210 is then moved in such a way that its shaft 211 is moved in the direction opposite to A. The cylinder 221 retracts, and then, in a second phase, actuates the disk 240 once this is in contact with the wall 221b of the cylinder 221. The fork element 242 is then repositioned for the mounting of the next flange 22, and the situation is then once again that shown in FIGS. 4 and 5a.

The installation of a heat exchanger according to the invention is as follows.

First, the bundle of tubes 21 is fitted into the assembly of holes 22c of one of the flanges 22 (arrow F in FIG. 2), in the manner described earlier, in relation to FIGS. 4 to 8. The plates 50 are then threaded into the tube bundle 21, and the cross-members 24 are set in place, as described previously.

The assembly created in this way is then placed in the body unit 10, in such a way that the flange 22 under consideration is located in one of the mounts 14 of the body unit 10, and such that the assembly of tubes 21 is located in the interior of the body unit 10.

It will be noted that, because the body unit 10 is symmetrical in relation to a median transverse plane, the order in which the flanges 22 are fitted is not of importance.

Next, the second flange 22 is fitted onto the end of the tubes 21, as previously described, and in such a way that the said flange 22 rests in the other mounting 14 of the body unit 10.

One of the reinforcing plates 23 is then fitted in place, which now rests on the external face of the flange under consideration. The screw 40 is placed on the truncated section 33 of a mouth element 30, and the annular part 31 of the said mouth element is then located so as to be supported on one of the said flanges 22. The screw 40 is screwed onto the corresponding thread of the body unit 10, the effect of which is to lock the circulate plate 22a of the flange 22 against the front face 31a of the section 31 of the mouth element 30 and the base of the mounting 14 of the body unit 10.

This procedure is repeated for the other reinforcing plate 23, the other screw 40, and the other mouth element 30. The fitting procedure is then competed, and the heat exchanger is ready to operate.

The total passage section in the tubes 21 is equal to the intake or outlet section of the mouth elements 30. Accordingly, the heat exchanger according to the invention does not create any delivery loss in the circuit to which it connected.

The body unit 10 is moulded. The inlet 12 and the outlet 13 are formed by suitable matched inserts and cores, which the operator places in the mould.

Accordingly, two inserts are placed in the mould, and the appropriate cores required in order to obtain an intake 12 and an outlet 13 at each end of the body unit 10, the said inlet 12 and the said outlet 13 being of small diameter.

It will be noted that the body unit 10, shown in FIG. 1, comprises means of fixation 16, formed, for example, by dowels introduced at the time of moulding, as well as a hole 17 in order to allow for the heat exchanger to be drained.

I claim:

1. A heat exchanger of the tube bundle (21) type having a plurality of tubes being rectilinear and parallel to one another and a body unit (10) of generally cylindrical shape, which is provided with an intake (12) and an outlet (13) for primary fluid, and end sections (11) fitted with flanges (22) closing off said body unit (10), and across which said tubes (21) pass, mouth elements (30) for the inlet and outlet of secondary fluid being provided at respective ends of said body unit (10), wherein each flange (22) is made of a rubber type material, and comprises a circular plate (22a) having faces with a set of circular lips on a periphery thereof, parallel to one another (22e and 22f), said flange (22) to rest, by means of one of the sets of lips (22e) on a radial surface of a corresponding end section (11) of said body unit (10), each mouth element (30) comprising an end section (31) provided with a radial front surface (31a) to rest on the other set of lips (22f) of said flange (22), a screw (40) for fastening to an outer wall of each end section (11) of said body unit (10), said screw (40) being provided with means (42) to lock said mouth element (30) against said flange (22) in such a way that said flange (22) will be locked between said mouth element (30) and said body (10).

2. A heat exchanger according to claim 1, wherein each mouth element (30) bears on its end section (91) a lug (31c) to penetrate into a groove (15) provided in the end section of said body unit (10) to immobilize said mouth element (30) against rotation when tho screw (40) is turned on the body unit (10).

3. A heat exchanger according to claim 1, further comprising reinforcing plates (23) which are fitted respectively between said flange (22) and said mouth element (30).

4. A heat exchanger according to claim 3, wherein said reinforcing plates (23) comprise at least one bracing element (23a).

5. A heat exchanger according to one of claims 1–4, wherein each said flange (22) is pierced by holes (22c) for passage of said tubes of the tube bundle (21), said holes being provided with at least one lip (22d).

6. A heat exchanger according to one of claims 1–4, wherein each said flange (22) is made of synthetic rubber, comprising the ethylene and polypropylene type of rubber.

7. A heat exchanger according to one of claims 1–4, wherein the end sections (11) of said body unit (10) are provided with mountings (14) in which are fitted, respectively, said flanges (22), which rest on bases of said mountings.

8. A heat exchanger according to one of claims 1–4, wherein said flanges (22) contain contacts (22b), pierced by said holes (22c) for passage of said tubes.

9. A machine for the installation of a heat exchanger according to claim 8, said machine comprising means of installation for the fitting of the tubes of the tube bundle in the holes (22c) of each flange (22) of said heat exchanger, wherein said means of installation comprise a support element (123) to support one of said flanges (22) of the heat exchanger, a multiplicity of finger elements (241), of a number equal to the number of tubes (21) of the bundle which is to be fitted, means to allow said finger elements (241) to penetrate and traverse corresponding holes (22c) of the flange (22) mounted on said support element (123), in that said flange (22) can come to rest on said finger elements (241), means to guide each tube (21) of the tube bundle in an extension of a corresponding finger element (241), coaxially thereto, and means to push said flange (22) which rests on said finger elements (241) to pass onto the tubes (210) of said bundle, extending said finger elements (241), the diameter of said finger elements (241) being slightly greater than the diameter of said tubes (21) which are to fitted.

10. A machine according to claim 9, wherein said finger elements (241) are displaced axially in an initial direction to penetrate into the corresponding holes of the flange mounted on said support element (123), and in a second direction to actuate the flange (22) which is resting on them, said finger elements (241) traversing the end wall of a cylinder (221), and said cylinder (221) being axially displaced relative to said finger elements (241) in said initial direction, in order for said end wall to push said flange (22), resting on said fingers (221) to cause movement onto the tubes (21).

11. A machine according to claim 10, wherein said finger elements are carried by a disk (240) to slide axially in a blind hole (221a) of said cylinder (221).

12. A machine according to claim 10, wherein said cylinder (221) is actuated by means of actuation (210) and a fork element (242) to couple said cylinder (221) to said disk (240) bearing said finger elements (241).

13. A machine according to claim 12, further comprising rods (113) to accommodate said tubes (21) of the tube bundle which is to be installed, and to bring said tubes (21) into position as an axial extension of said finger elements (241).

* * * * *